(12) United States Patent
Marco et al.

(10) Patent No.: US 10,853,607 B2
(45) Date of Patent: *Dec. 1, 2020

(54) THREE-DIMENSIONAL ROTATABLY-READABLE ENCODING OF DATA FOR OPTICAL MACHINE-READING

(71) Applicant: Genie Enterprise Ltd., Rishpon (IL)

(72) Inventors: Doron Bernard Marco, Tel Aviv (IL); Ayelet Carasso, Tel Aviv (IL)

(73) Assignee: Genie Enterprise Ltd., Rishpon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,721

(22) Filed: Jun. 26, 2019

(65) Prior Publication Data
US 2019/0370516 A1 Dec. 5, 2019

Related U.S. Application Data

(63) Continuation of application No. 15/538,353, filed as application No. PCT/IL2015/051244 on Dec. 22, 2015, now Pat. No. 10,339,353.
(Continued)

(51) Int. Cl.
*G06K 15/00* (2006.01)
*G06K 7/14* (2006.01)
(Continued)

(52) U.S. Cl.
CPC ............. *G06K 7/1408* (2013.01); *G06K 7/10* (2013.01); *G06K 7/10712* (2013.01);
(Continued)

(58) Field of Classification Search
CPC ................ B65D 1/265; B65D 55/0827; G06K 19/06037; G06K 7/10693; G06K 7/10722; G09F 2003/0251; G09F 2003/0272
See application file for complete search history.

(56) References Cited

U.S. PATENT DOCUMENTS 4,449,042 A 5/1984 Hampson et al.
5,270,522 A * 12/1993 Bone, Jr. .......... G06K 19/06028
                                                        235/375
(Continued)

FOREIGN PATENT DOCUMENTS

| EP | 1026084 | 8/2000 |
| EP | 1764015 | 3/2007 |
| WO | 2016/103261 | 6/2016 |

OTHER PUBLICATIONS

U.S. Appl. No. 62/095,338, filed Dec. 22, 2014.
(Continued)

*Primary Examiner* — Thien M Le
(74) *Attorney, Agent, or Firm* — Sughrue Mion, PLLC (57) ABSTRACT

An object bearing a three-dimensional rotatably-readable encoding of data configured for optical rotational machine-reading, the object being a subject of the data, the encoding of data including a multiplicity of three-dimensional shapes formed on a label adhered to a surface of the object, the surface being arranged for rotation in a plane coinciding with the surface, the multiplicity of three-dimensional shapes being formed to reflect light impinging thereupon while the surface is rotated, characteristics of the reflected light representing data encoded within the multiplicity of three-dimensional shapes.

20 Claims, 4 Drawing Sheets

Related U.S. Application Data (60) Provisional application No. 62/095,338, filed on Dec. 22, 2014.

(51) Int. Cl.
 G06K 19/06 (2006.01)
 G06K 7/10 (2006.01)

(52) U.S. Cl.
 CPC ... G06K 7/10861 (2013.01); G06K 19/06168 (2013.01); *G06K 2007/10504* (2013.01)

(56) References Cited

U.S. PATENT DOCUMENTS

| | | | |
|---|---|---|---|
| 5,742,420 A * | 4/1998 | Peng | G06K 7/10693 |
| | | | 235/462.38 |
| 5,788,076 A * | 8/1998 | Simmons | B65D 23/0842 |
| | | | 206/459.5 |
| 7,473,869 B2 | 1/2009 | Chun | |
| 7,723,655 B2 | 5/2010 | Kim | |
| 8,207,479 B2 | 6/2012 | Ben-Shmuel et al. | |
| 8,389,916 B2 | 3/2013 | Ben-Shmuel et al. | |
| 8,492,686 B2 | 7/2013 | Bilchinsky et al. | |
| 8,653,482 B2 | 2/2014 | Ben-Shmuel | |
| 8,742,306 B2 | 6/2014 | Atzmony et al. | |
| 8,759,729 B2 | 6/2014 | Ben-Shmuel et al. | |
| 8,777,107 B1 * | 7/2014 | Bao | G06K 7/10762 |
| | | | 235/462.01 |
| 8,839,527 B2 | 9/2014 | Ben-Shmuel et al. | |
| 8,922,969 B2 | 12/2014 | Sigalov et al. | |
| 8,941,040 B2 | 1/2015 | Ben-Shmuel et al. | |
| 8,945,428 B2 | 2/2015 | Ben-Shmuel et al. | |
| 8,976,030 B2 * | 3/2015 | Cunningham | G08B 13/246 |
| | | | 235/385 |
| 9,040,879 B2 | 5/2015 | Libman et al. | |
| 9,040,883 B2 | 5/2015 | Ben-Shmuel et al. | |
| 9,078,297 B2 | 7/2015 | Bilchinsky et al. | |
| 9,078,298 B2 | 7/2015 | Ben-Shmuel et al. | |
| 9,129,229 B2 | 9/2015 | Ben-Haim et al. | |
| 9,131,543 B2 | 9/2015 | Ben-Shmuel et al. | |
| 9,132,408 B2 | 9/2015 | Einziger et al. | |
| 9,161,390 B2 | 10/2015 | Gelbart et al. | |
| 9,167,633 B2 | 10/2015 | Ben-Shmuel et al. | |
| 9,210,740 B2 | 12/2015 | Libman et al. | |
| 9,215,756 B2 | 12/2015 | Bilchinsky et al. | |
| 9,265,097 B2 | 2/2016 | Torres et al. | |
| 9,301,344 B2 | 3/2016 | Ibragimov et al. | |
| 9,320,388 B2 | 4/2016 | Storek et al. | |
| 9,332,591 B2 | 5/2016 | Libman et al. | |
| 9,342,826 B2 | 5/2016 | Ben-Haim et al. | |
| 9,346,611 B1 | 5/2016 | Roberts et al. | |
| 9,351,347 B2 | 5/2016 | Torres et al. | |
| 9,374,852 B2 | 6/2016 | Bilchinsky et al. | |
| 9,408,492 B1 | 8/2016 | Roberts et al. | |
| 9,408,493 B1 | 8/2016 | Roberts et al. | |
| 9,414,442 B2 | 8/2016 | Torres et al. | |
| 9,414,444 B2 | 8/2016 | Libman et al. | |
| 9,445,614 B2 | 9/2016 | Storek et al. | |
| 9,459,346 B2 | 10/2016 | Einziger et al. | |
| 9,462,635 B2 | 10/2016 | Bilchinsky et al. | |
| 9,468,230 B2 | 10/2016 | Roberts et al. | |
| 9,480,359 B1 | 11/2016 | Kalenian | |
| 9,487,348 B2 | 11/2016 | Roberts et al. | |
| 9,504,095 B2 | 11/2016 | Gelbart et al. | |
| 9,516,970 B2 | 12/2016 | Roberts et al. | |
| 9,538,877 B2 | 1/2017 | Roberts et al. | |
| 9,549,635 B1 | 1/2017 | Kalenian | |
| 9,609,692 B2 | 3/2017 | Bilchinsky et al. | |
| 9,615,597 B2 | 4/2017 | Roberts et al. | |
| 9,630,770 B2 | 4/2017 | Roberts et al. | |
| 9,675,203 B2 | 6/2017 | Roberts et al. | |
| 9,699,835 B2 | 7/2017 | Yogev et al. | |
| 9,730,542 B2 | 8/2017 | Storek et al. | |
| 9,804,104 B2 | 10/2017 | Libman et al. | |
| 9,807,823 B2 | 10/2017 | Einziger et al. | |
| 10,339,353 B2 * | 7/2019 | Marco | G06K 7/10861 |
| 2003/0121979 A1 | 7/2003 | D'Haens et al. | |
| 2008/0290087 A1 | 11/2008 | Ben-Shmuel et al. | |
| 2009/0045191 A1 | 2/2009 | Ben-Shmuel et al. | |
| 2009/0057302 A1 | 3/2009 | Ben-Shmuel et al. | |
| 2009/0224032 A1 | 9/2009 | Kondou et al. | |
| 2009/0236333 A1 | 9/2009 | Ben-Shmuel et al. | |
| 2009/0236334 A1 | 9/2009 | Ben-Shmuel et al. | |
| 2009/0236335 A1 | 9/2009 | Ben-Shmuel et al. | |
| 2010/0006564 A1 | 1/2010 | Ben-Shmuel et al. | |
| 2010/0006565 A1 | 1/2010 | Ben-Shmuel et al. | |
| 2010/0078480 A1 | 4/2010 | Aker | |
| 2010/0115785 A1 | 5/2010 | Ben-Shmuel et al. | |
| 2011/0017728 A1 | 1/2011 | Ben-Shmuel et al. | |
| 2011/0031236 A1 | 2/2011 | Ben-Shmuel et al. | |
| 2011/0031237 A1 | 2/2011 | Bilchinsky et al. | |
| 2011/0031240 A1 | 2/2011 | Ben-Shmuel et al. | |
| 2011/0033584 A1 | 2/2011 | Bilchinsky et al. | |
| 2011/0117259 A1 | 5/2011 | Storek et al. | |
| 2011/0154836 A1 | 6/2011 | Ben-Shmuel | |
| 2011/0198343 A1 | 8/2011 | Bilchinsky et al. | |
| 2011/0266463 A1 | 11/2011 | Einziger et al. | |
| 2012/0067872 A1 | 3/2012 | Libman et al. | |
| 2012/0097665 A1 | 4/2012 | Bilchinsky et al. | |
| 2012/0103973 A1 | 5/2012 | Rogers et al. | |
| 2012/0122072 A1 | 5/2012 | Bilchinsky et al. | |
| 2012/0164022 A1 | 6/2012 | Muginstein et al. | |
| 2012/0168645 A1 | 7/2012 | Atzmony et al. | |
| 2012/0175363 A1 | 7/2012 | Ron et al. | |
| 2012/0267361 A1 | 10/2012 | Ben-Shmuel et al. | |
| 2012/0312801 A1 | 12/2012 | Bilchinsky et al. | |
| 2013/0037619 A1 | 2/2013 | Key | |
| 2013/0048880 A1 | 2/2013 | Einziger et al. | |
| 2013/0048881 A1 | 2/2013 | Einziger et al. | |
| 2013/0056460 A1 | 3/2013 | Ben-Shmuel et al. | |
| 2013/0062334 A1 | 3/2013 | Bilchinsky et al. | |
| 2013/0087545 A1 | 4/2013 | Bilchinsky et al. | |
| 2013/0098988 A1 | 4/2013 | Ben-Haim et al. | |
| 2013/0119054 A1 | 5/2013 | Ben-Shmuel et al. | |
| 2013/0142923 A1 | 6/2013 | Torres et al. | |
| 2013/0146590 A1 | 6/2013 | Einziger et al. | |
| 2013/0171023 A1 | 7/2013 | Ben-Shmuel et al. | |
| 2013/0206749 A1 | 8/2013 | Libman et al. | |
| 2013/0216673 A1 | 8/2013 | Storek et al. | |
| 2013/0219737 A1 | 8/2013 | Rogers et al. | |
| 2013/0240757 A1 | 9/2013 | Einziger et al. | |
| 2013/0248521 A1 | 9/2013 | Torres et al. | |
| 2013/0284725 A1 | 10/2013 | Bilchinsky et al. | |
| 2013/0290106 A1 | 10/2013 | Bradley et al. | |
| 2013/0306626 A1 | 11/2013 | Torres et al. | |
| 2013/0306729 A1 | 11/2013 | Dilks et al. | |
| 2013/0313250 A1 | 11/2013 | Ibragimov et al. | |
| 2013/0334214 A1 | 12/2013 | Yogev et al. | |
| 2014/0063676 A1 | 3/2014 | Sigalov et al. | |
| 2014/0106033 A1 | 4/2014 | Roberts | |
| 2014/0126829 A1 | 5/2014 | Seeley et al. | |
| 2014/0159832 A1 | 6/2014 | Einziger et al. | |
| 2014/0199454 A1 | 7/2014 | Storek et al. | |
| 2014/0224889 A1 | 8/2014 | Key | |
| 2014/0232274 A1 | 8/2014 | Atzmony et al. | |
| 2014/0252093 A1 | 9/2014 | Jarisch et al. | |
| 2014/0345152 A1 | 11/2014 | Ben-Shmuel et al. | |
| 2015/0034632 A1 | 2/2015 | Brill et al. | |
| 2015/0070029 A1 | 3/2015 | Libman et al. | |
| 2015/0156827 A1 | 6/2015 | Ibragimov et al. | |
| 2015/0223294 A1 | 8/2015 | Zickel et al. | |
| 2015/0245423 A1 | 8/2015 | Libman et al. | |
| 2015/0245424 A1 | 8/2015 | Brill | |
| 2015/0312971 A1 | 10/2015 | Ben-Shmuel et al. | |
| 2015/0339653 A1 | 11/2015 | Ben-Haim et al. | |
| 2015/0346335 A1 | 12/2015 | Einziger et al. | |
| 2015/0363686 A1 * | 12/2015 | Yang | G06K 19/07773 |
| | | | 235/492 |
| 2015/0366006 A1 | 12/2015 | Ben-Shmuel et al. | |
| 2015/0382400 A1 | 12/2015 | Gelbart et al. | |
| 2016/0088689 A1 | 3/2016 | Torres et al. | |
| 2016/0088847 A1 | 3/2016 | Torres et al. | |
| 2016/0095171 A1 | 3/2016 | Chaimov et al. | |
| 2016/0113072 A1 | 4/2016 | Ibragimov et al. | |

(56) References Cited

U.S. PATENT DOCUMENTS

| | | |
|---|---|---|
| 2016/0161425 A1 | 6/2016 | Berezin et al. |
| 2016/0206136 A1 | 7/2016 | Storek et al. |
| 2016/0223402 A1 | 8/2016 | Libman et al. |
| 2016/0249416 A1 | 8/2016 | Elboim et al. |
| 2016/0260001 A1* | 9/2016 | Flores .............. G06K 19/06037 |
| 2016/0270429 A1 | 9/2016 | Roberts et al. |
| 2016/0270583 A1 | 9/2016 | Roberts et al. |
| 2016/0270584 A1 | 9/2016 | Roberts et al. |
| 2016/0272414 A1 | 9/2016 | Roberts et al. |
| 2016/0288988 A1 | 10/2016 | Roberts et al. |
| 2016/0288990 A1 | 10/2016 | Roberts et al. |
| 2016/0309548 A1 | 10/2016 | Libman et al. |
| 2016/0335833 A1 | 11/2016 | Huang |
| 2016/0338539 A1 | 11/2016 | Storek et al. |
| 2016/0345389 A1 | 11/2016 | Torres et al. |
| 2016/0353528 A1 | 12/2016 | Bilchinsky et al. |
| 2016/0374158 A1 | 12/2016 | Einziger et al. |
| 2016/0374504 A1 | 12/2016 | Hoon |
| 2017/0000151 A1 | 1/2017 | Roberts et al. |
| 2017/0027026 A1 | 1/2017 | Bilchinsky et al. |
| 2017/0027375 A1 | 2/2017 | Kalenian |
| 2017/0041989 A1 | 2/2017 | Gelbart et al. |
| 2017/0055557 A1 | 3/2017 | Roberts et al. |
| 2017/0055761 A1 | 3/2017 | Roberts et al. |
| 2017/0065121 A1 | 3/2017 | Roberts et al. |
| 2017/0111962 A1 | 4/2017 | Bilchinsky et al. |
| 2017/0164431 A1 | 6/2017 | Bilchinsky et al. |
| 2017/0164432 A1 | 6/2017 | Einziger et al. |
| 2017/0273495 A1 | 9/2017 | Choueiri et al. |
| 2018/0063625 A1* | 3/2018 | Boesen .................. G06F 3/011 |
| 2018/0121775 A1 | 5/2018 | Sharma et al. |
| 2018/0276437 A1 | 9/2018 | Marco et al. |

OTHER PUBLICATIONS

An International Preliminary Report on Patentability dated Jun. 27, 2017, which issued during the prosecution of Applicant's PCT/IL2015/051244.

An International Search Report and a Written Opinion both dated May 13, 2016, which issued during the prosecution of Applicant's PCT/IL2015/051244.

An Office Action dated Jul. 25, 2018, which issued during the prosecution of U.S. Appl. No. 15/538,353.

Notice of Allowance dated Feb. 21, 2019, which issued during the prosecution of U.S. Appl. No. 15/538,353.

European Search Report dated Aug. 6, 2018 which issued during the prosecution of Applicant's European App No. 15872101.9.

* cited by examiner

THREE-DIMENSIONAL ROTATABLY-READABLE ENCODING OF DATA FOR OPTICAL MACHINE-READING

REFERENCE TO RELATED APPLICATIONS

This application is a continuation of U.S. patent application Ser. No. 15/548,353, filed Jun. 21, 2017, entitled "Three-Dimensional Rotatably-Readable Encoding of Data For Optical Machine-Reading", now U.S. Pat. No. 10,339,353, which is a U.S. National Phase application under 35 U.S.C. § 371 of International Patent Application No. PCT/IL2015/051244, filed Dec. 22, 2015, and claims the priority of U.S. Provisional Patent Application Ser. No. 62/095,338, filed Dec. 22, 2014 and entitled "THREE-DIMENSIONAL ROTATABLY-READABLE ENCODING OF DATA FOR OPTICAL SPEED-DEPENDENT MACHINE-READING", the disclosures of which are hereby incorporated by reference and priority of which are hereby claimed.

FIELD OF THE INVENTION

The present invention relates to systems and methods for encoding, reading and decoding machine-readable data encoded in three-dimensional rotatably-readable encodings of data configured for optical rotational machine-reading.

BACKGROUND OF THE INVENTION

Current methods of encoding data in a printed encoding typically comprise encoding a string of data in static one- or two-dimensional black and white encodings, such as barcodes and QR codes. The amount of data which can be encoded in such encodings is typically limited by the size of the area available for printing of the encoding and by the size of a reader suitable for machine-reading of the encoding.

The present invention seeks to provide a novel method of encoding data which utilizes both a third dimension of the encoding, as well as a speed of rotation of the encoding while being read, to encode data. The present invention thereby facilitates significantly increasing the amount of data which can be encoded in an encoding printed on a given area over current methods which employ static one- and two-dimensional encodings.

SUMMARY OF THE INVENTION

The present invention seeks to provide methods and systems for encoding, reading and decoding machine-readable data encoded in three-dimensional rotatably-readable encodings of data configured for optical rotational machine-reading.

There is thus provided in accordance with a preferred embodiment of the present invention an object bearing a three-dimensional rotatably-readable encoding of data configured for optical rotational machine-reading, the object being a subject of the data, the encoding of data including a multiplicity of three-dimensional shapes formed on a label adhered to a surface of the object, the surface being arranged for rotation in a plane coinciding with the surface, the multiplicity of three-dimensional shapes being formed to reflect light impinging thereupon while the surface is rotated, characteristics of the reflected light representing data encoded within the multiplicity of three-dimensional shapes.

Preferably, the three-dimensional shapes are three-dimensional concentric curves. Alternatively, the three-dimensional shapes are three-dimensional non-overlapping straight lines.

Preferably, the characteristics of the light reflected from each of the three-dimensional shapes include at least one of an angle of reflection of the reflected light and an intensity of the reflected light. Additionally or alternatively, the characteristics of the light reflected from each of the three-dimensional shapes correspond at least to physical characteristics of a corresponding one of the three-dimensional shapes and a speed of the rotation.

Preferably, the physical characteristics of each of the three-dimensional shapes include a color of the shape. Additionally or alternatively, the physical characteristics of each of the three-dimensional shapes include at least one dimension of the shape.

Preferably, the at least one dimension of the shape includes a width of the shape. Additionally or alternatively, the at least one dimension of the shape includes a length of the shape. Additionally or alternatively, the at least one dimension of the shape includes a distance between the shape and an adjacent shape. Additionally or alternatively, the at least one dimension of the shape includes a height of the shape.

Preferably, the physical characteristics of each of the three-dimensional shapes include a material forming the shape. Preferably, the height of the shape is characteristic of the material forming the shape. Additionally or alternatively, the physical characteristics of each of the three-dimensional shapes include a physical coating of the shape. Preferably, the height of the shape is characteristic of the physical coating of the shape.

Preferably, the object is a container having an interior volume. Preferably, the interior volume contains at least one of a solid and a liquid. Preferably, the interior volume contains at least one of fresh food, preserved food and raw food. Preferably, the data includes instructions which, when read by a computer, cause the computer to process contents of the interior volume in accordance with the instructions. Additionally or alternatively, the data includes at least one of a price of the object, a catalog number of the object or an expiration date of the object.

There is also provided in accordance with another preferred embodiment of the present invention a system for optical rotational machine-reading of data encoded in a three-dimensional rotatably-readable encoding of data on a surface of an object, the object being a subject of the data, the system including surface rotating functionality operable for rotating the surface in a plane coinciding with the surface, the surface including a multiplicity of three-dimensional shapes formed on a label adhered to the surface, light impinging functionality operable for impinging light onto the multiplicity of three-dimensional shapes, the multiplicity of three-dimensional shapes being formed to reflect light impinging thereupon while the surface is rotated by the surface rotating functionality, light detecting functionality operable, responsive to the impinging light onto the multiplicity of three-dimensional shapes and to the rotating the surface by the surface rotating functionality, for detecting light reflected from the multiplicity of three-dimensional shapes, characteristics of the reflected light representing data encoded within the multiplicity of three-dimensional shapes, and data decoding functionality operable, responsive to the detecting light reflected from the multiplicity of three-dimensional shapes, for decoding the data encoded in the multiplicity of three-dimensional shapes.

Preferably, the three-dimensional shapes are three-dimensional concentric curves. Alternatively, the three-dimensional shapes are three-dimensional non-overlapping straight lines.

Preferably, the characteristics of the light reflected from each of the three-dimensional shapes include at least one of an angle of reflection of the reflected light and an intensity of the reflected light. Additionally or alternatively, the characteristics of the light reflected from each of the three-dimensional shapes correspond at least to physical characteristics of a corresponding one of the three-dimensional shapes and a speed of the rotation.

Preferably, the physical characteristics of each of the three-dimensional shapes include a color of the shape. Additionally or alternatively, the physical characteristics of each of the three-dimensional shapes include at least one dimension of the shape. Preferably, the at least one dimension of the shape includes a width of the shape. Additionally or alternatively, the at least one dimension of the shape includes a length of the shape. Additionally or alternatively, the at least one dimension of the shape includes a distance between the shape and an adjacent shape. Additionally or alternatively, the at least one dimension of the shape includes a height of the shape.

Preferably, the physical characteristics of each of the three-dimensional shapes includes a material forming the shape. Preferably, the height of the shape is characteristic of the material forming the shape.

Additionally or alternatively, the physical characteristics of each of the three-dimensional shapes include a physical coating of the shape. Preferably, the height of the shape is characteristic of the physical coating of the shape.

Preferably, the object is a container having an interior volume. Preferably, the interior volume contains at least one of a solid and a liquid. Preferably, the interior volume contains at least one of fresh food, preserved food and raw food. Preferably, the data includes instructions which, when read by a computer, cause the computer to process contents of the interior volume in accordance with the instructions. Additionally or alternatively, the data includes at least one of a price of the object, a catalog number of the object or an expiration date of the object.

There is further provided in accordance with yet another preferred embodiment of the present invention a method for optical rotational machine-reading of data encoded in a three-dimensional rotatably-readable encoding of data on a surface of an object, the object being a subject of the data, the method including rotating the surface in a plane coinciding with the surface, the surface including a multiplicity of three-dimensional shapes formed on a label adhered to the surface, impinging light onto the multiplicity of three-dimensional shapes, the multiplicity of three-dimensional shapes being formed to reflect light impinging thereupon while the surface is rotated, responsive to the impinging light onto the multiplicity of three-dimensional shapes and to the rotating the surface, detecting light reflected from the multiplicity of three-dimensional shapes, characteristics of the reflected light representing data encoded within the multiplicity of three-dimensional shapes, and responsive to the detecting light reflected from the multiplicity of three-dimensional shapes, decoding the data encoded in the multiplicity of three-dimensional shapes.

Preferably, the three-dimensional shapes are three-dimensional concentric curves. Additionally or alternatively, the three-dimensional shapes are three-dimensional non-overlapping straight lines.

Preferably, the characteristics of the light reflected from each of the three-dimensional shapes include at least one of an angle of reflection of the reflected light and an intensity of the reflected light. Additionally or alternatively, the characteristics of the light reflected from each of the three-dimensional shapes correspond at least to physical characteristics of a corresponding one of the three-dimensional shapes and a speed of the rotation.

Preferably, the physical characteristics of each of the three-dimensional shapes include a color of the shape. Additionally or alternatively, the physical characteristics of each of the three-dimensional shapes include at least one dimension of the shape. Preferably, the at least one dimension of the shape includes a width of the shape. Additionally or alternatively, the at least one dimension of the shape includes a length of the shape. Additionally or alternatively, the at least one dimension of the shape includes a distance between the shape and an adjacent shape. Additionally or alternatively, the at least one dimension of the shape includes a height of the shape.

Preferably, the physical characteristics of each of the three-dimensional shapes includes a material forming the shape. Preferably, the height of the shape is characteristic of the material forming the shape.

Additionally or alternatively, the physical characteristics of each of the three-dimensional shapes include a physical coating of the shape. Preferably, the height of the shape is characteristic of the physical coating of the shape.

Preferably, the object is a container having an interior volume. Preferably, the interior volume contains at least one of a solid and a liquid. Preferably, the interior volume contains at least one of fresh food, preserved food and raw food. Preferably, the data includes instructions which, when read by a computer, cause the computer to process contents of the interior volume in accordance with the instructions. Additionally or alternatively, the data includes at least one of a price of the object, a catalog number of the object or an expiration date of the object.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1A:
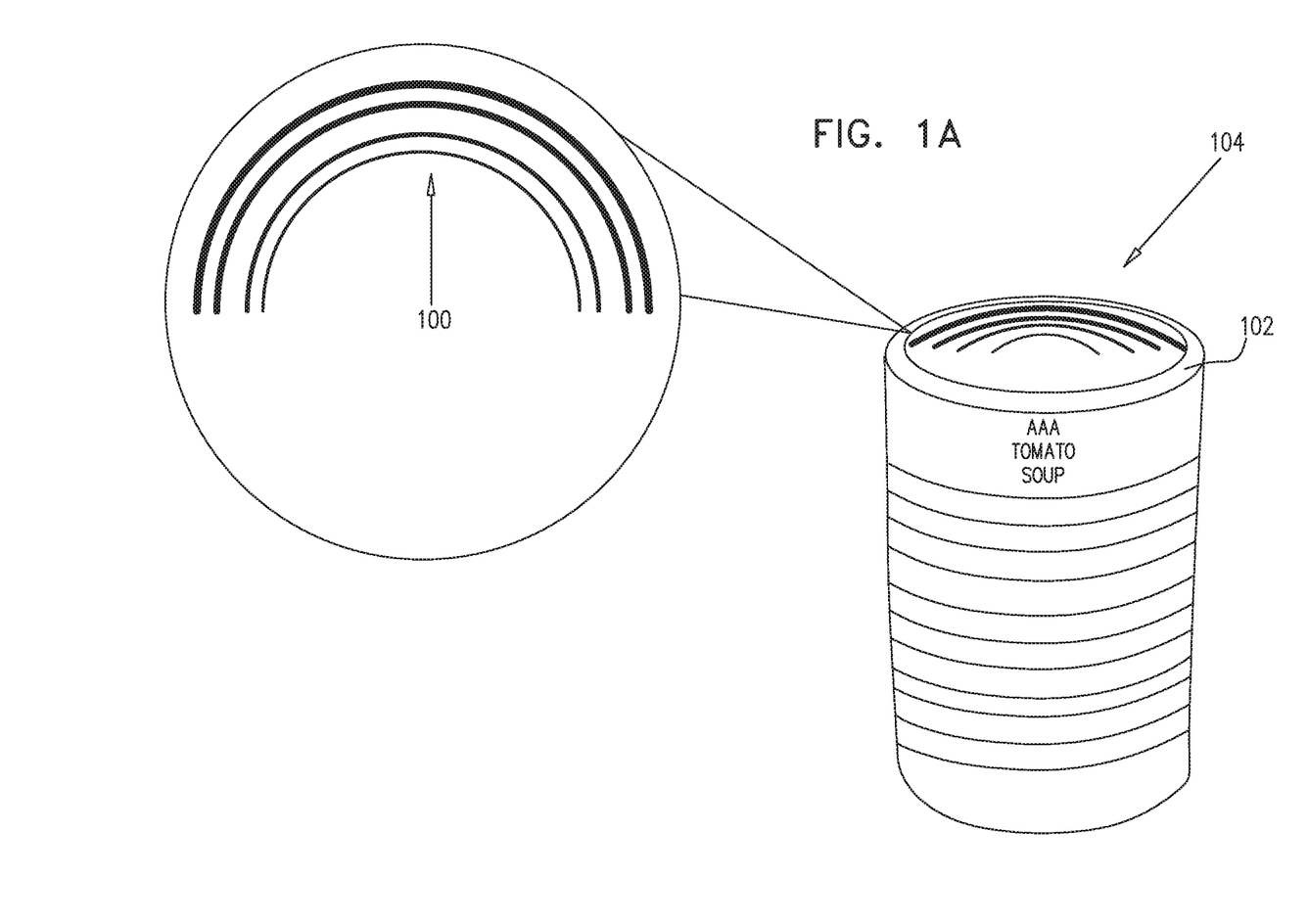
FIGS. 1A and 1B are simplified pictorial illustrations of examples of three-dimensional rotatably-readable encodings of data configured for optical rotational machine-reading, constructed and operative in accordance with a preferred embodiment of the present invention.
Figure 1B:
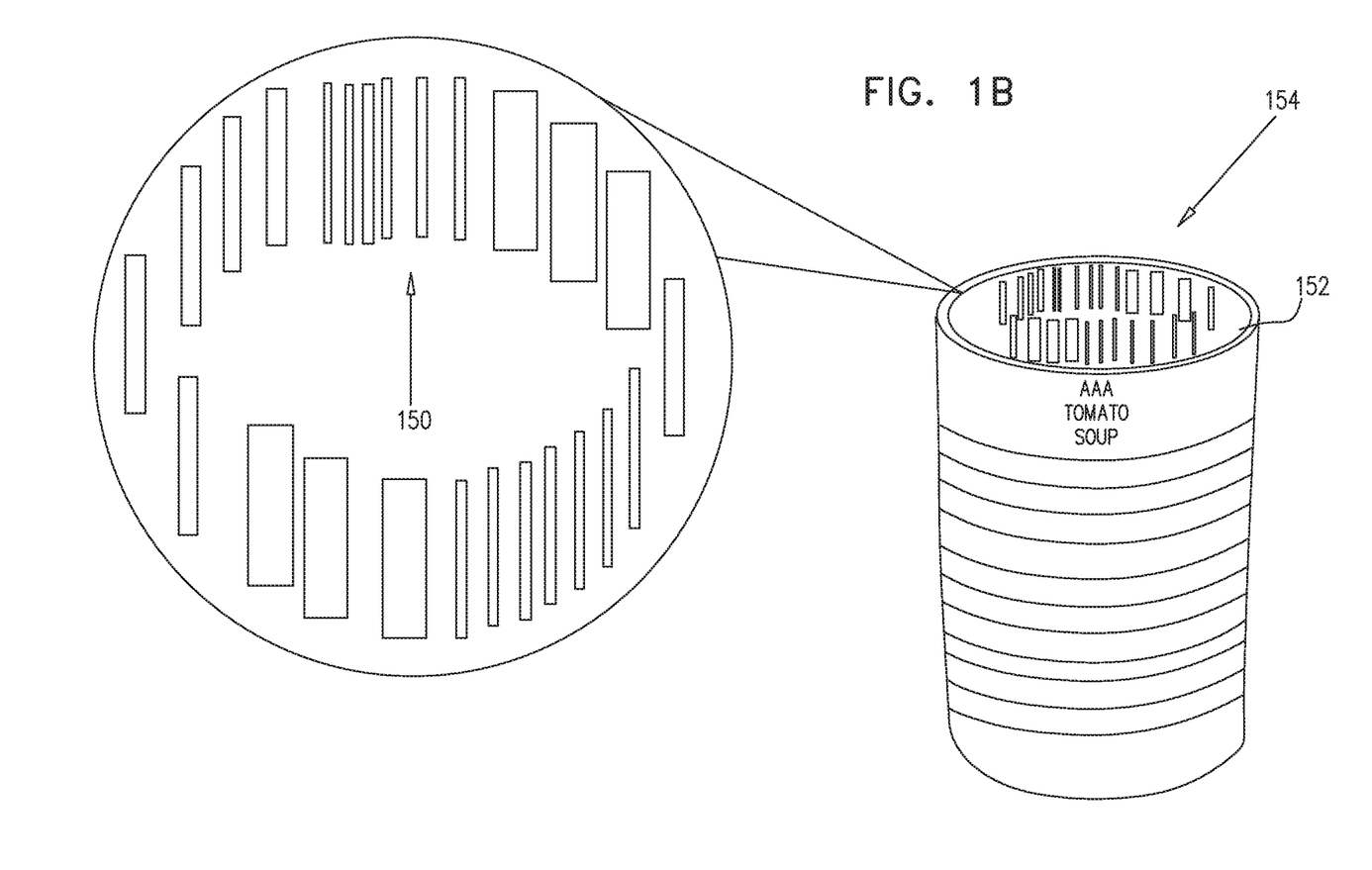

Reference is now made to FIGS. 1A and 1B, which are simplified pictorial illustrations of examples of an object bearing three-dimensional rotatably-readable encodings of data configured for optical rotational machine-reading, constructed and operative in accordance with a preferred embodiment of the present invention. The rotatably-readable encoding of data configured for optical rotational machine-reading illustrated in FIG. 1A preferably includes a multiplicity of three-dimensional concentric curves 100 encoding data. Three-dimensional concentric curves 100 are preferably formed on a surface 102. Alternatively, three-dimensional concentric curves 100 may be formed on an article separate from surface 102, such as, for example, a sticker or a label, which is then fastened to surface 102.

Surface 102 may be, for example, a generally circular surface as shown in FIG. 1A, or a surface of any other suitable shape or dimension. Surface 102 typically forms part of a product 104, product 104 preferably being the subject of the data encoded in three-dimensional concentric curves 100. Product 104 may be, for example, a consumer product or a container having an interior volume, which volume contains a solid or liquid product such as, for example, fresh food, preserved food or raw food.

The data encoded in three-dimensional concentric curves 100 may include, for example, instructions which, when read by a computer, cause the computer to process product 104 or the contents thereof in accordance with the instructions. Alternatively, the data may include, for example, a price of product 104, a catalog number of product 104 or an expiration date of product 104.

It is a particular feature of this embodiment of the present invention that three-dimensional concentric curves 100 are formed to reflect light impinging thereupon while surface 102 is rotated in a plane coinciding therewith, the characteristics of the reflected light representing the data encoded within three-dimensional concentric curves 100.

The characteristics of the light reflected from each of three-dimensional concentric curves 100 preferably comprise at least one of an angle of reflection of the reflected light and an intensity of the reflected light, however it is appreciated that the reflected light may have additional characteristics associated therewith. It is appreciated that the characteristics of the light reflected from each of three-dimensional concentric curves 100 correspond to physical characteristics of a corresponding one of three-dimensional concentric curves 100. The physical characteristics of each of three-dimensional concentric curves 100 may include, for example, a color of the curve, a length of the curve, a distance between the curve and an adjacent concentric curve, and a height of the curve as dictated by a physical coating of the curve or by the material forming the curve. These characteristics of the curve are fundamental in characterizing the light reflected from the curve, and are therefore suitable for encoding data.

It is further appreciated that the speed of rotation of surface 102 while light is impinged onto surface 102 also characterizes the light reflected from each of three-dimensional concentric curves 100. Therefore, three-dimensional concentric curves 100 may encode a multiplicity of data sets, wherein encoded data of each data set is represented by light reflected from surface 102 while surface 102 is rotated at a corresponding speed.

Turning now to FIG. 1B, there is shown a rotatably-readable encoding of data configured for optical rotational machine-reading which includes a multiplicity of three-dimensional non-overlapping straight lines 150 which non-overlapping straight lines 150 encode data. Three-dimensional lines 150 are preferably formed on a surface 152. Alternatively, three-dimensional non-overlapping straight lines 150 may be formed on an article separate from surface 152, such as, for example, a sticker or a label, which is then fastened to surface 152.

Surface 152 may be, for example, a generally circular surface as shown in FIG. 1B, or a surface of any other suitable shape or dimension. Surface 152 typically forms part of a product 154, product 154 preferably being the subject of the data encoded in three-dimensional non-overlapping straight lines 150. Product 154 may be, for example, a consumer product or a container having an interior volume, which volume contains a solid or liquid product such as, for example, fresh food, preserved food or raw food.

The data encoded in lines 150 may include, for example, instructions which, when read by a computer, cause the computer to process product 154 or the contents thereof in accordance with the instructions. Alternatively, the data may include, for example, a price of product 154, a catalog number of product 154 or an expiration date of product 154.

It is a particular feature of this embodiment of the present invention that three-dimensional non-overlapping straight lines 150 are formed to reflect light impinging thereupon while surface 152 is rotated in a plane coinciding therewith, the characteristics of the reflected light representing the data encoded within three-dimensional non-overlapping straight lines 150.

The characteristics of the light reflected from each three-dimensional non-overlapping straight lines 150 preferably comprise at least one of an angle of reflection of the reflected light and an intensity of the reflected light, however it is appreciated that the reflected light may have additional characteristics associated therewith. It is appreciated that the characteristics of the light reflected from each of three-dimensional non-overlapping straight lines 150 correspond to physical characteristics of a corresponding one of three-dimensional non-overlapping straight lines 150. The physical characteristics of each of three-dimensional non-overlapping straight lines 150 may include, for example, a color of the line, a length of the line, a distance between the line and an adjacent line, and a height of the line as dictated by a physical coating of the line or by the material forming the line. These characteristics of the line are fundamental in characterizing the light reflected from the line, and are therefore suitable for encoding data.

It is further appreciated that the speed of rotation of surface 152 while light is impinged onto surface 152 also characterizes the light reflected from each of three-dimensional non-overlapping straight lines 150. Therefore, three-dimensional non-overlapping straight lines 150 may encode a multiplicity of data sets, wherein encoded data of each data set is represented by light reflected from surface 152 while surface 152 is rotated at a corresponding speed.

Figure 2A:
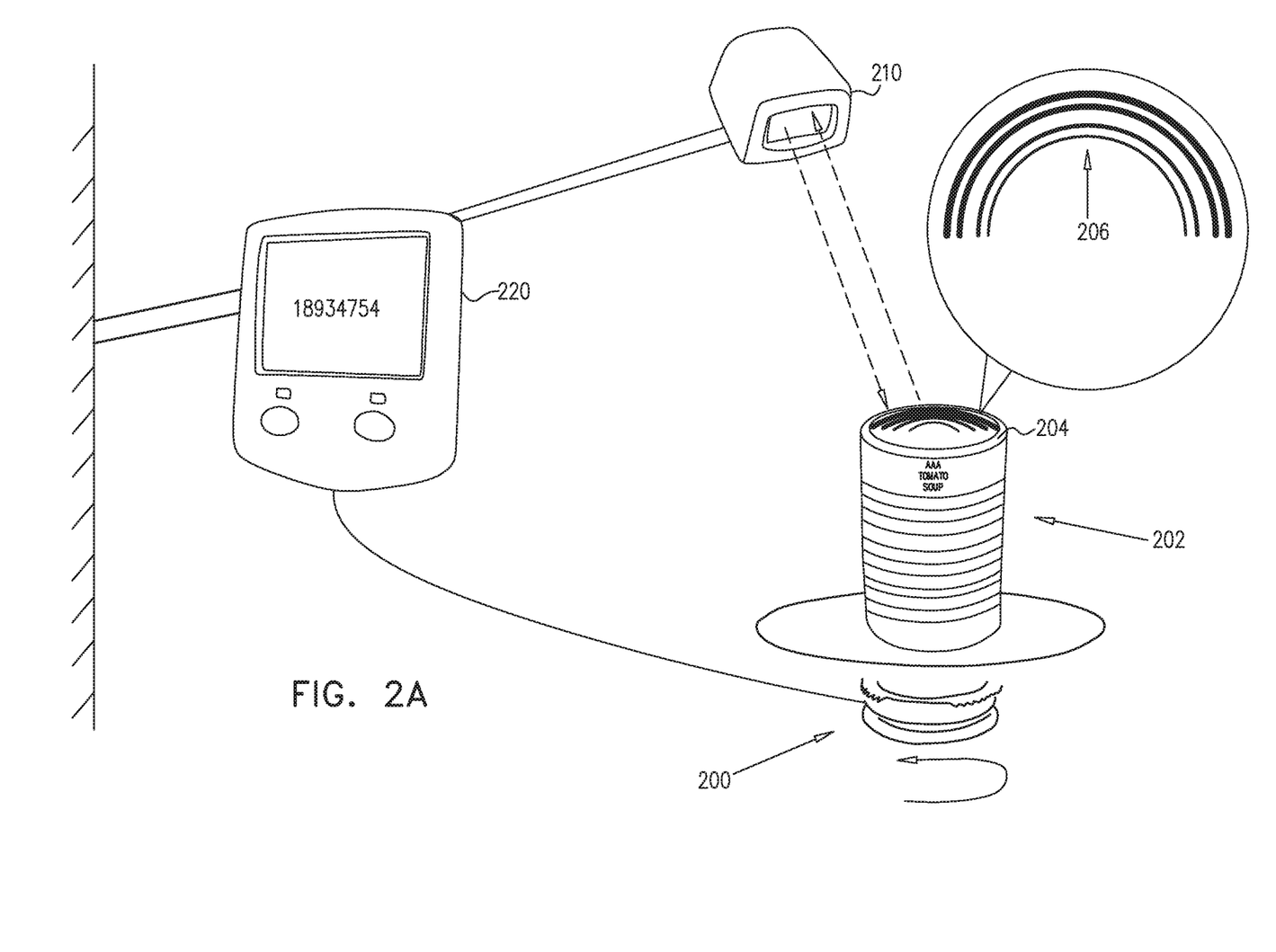
FIGS. 2A and 2B are simplified pictorial illustrations of a system for optical rotational machine-reading of data encoded in a three-dimensional rotatably-readable encoding of data, constructed and operative in accordance with another preferred embodiment of the present invention.
Figure 2B:
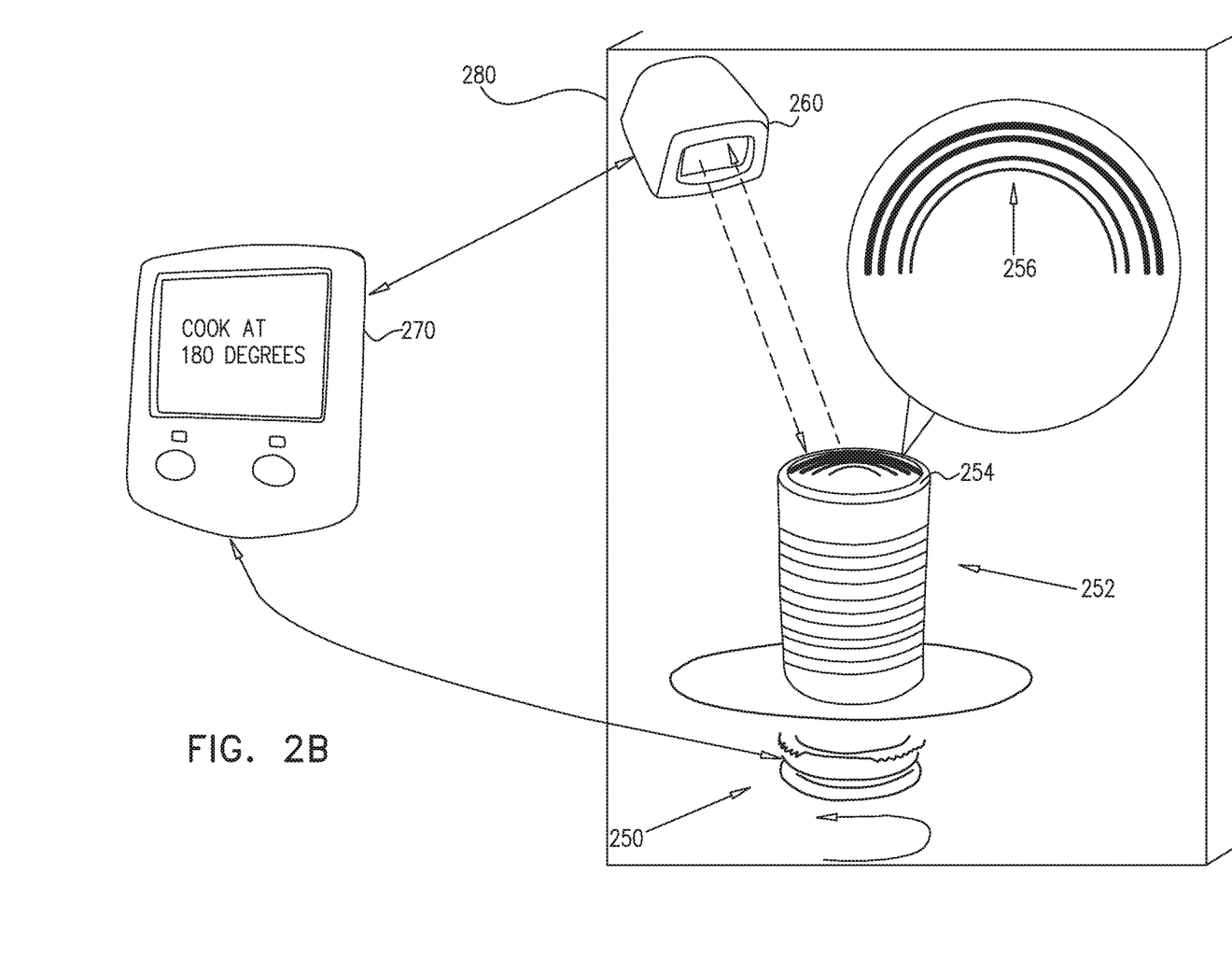

Reference is now made to FIGS. 2A and 2B, which are simplified pictorial illustrations of a system for optical rotational machine-reading of data encoded in a three-dimensional rotatably-readable encoding of data on a surface of an object, constructed and operative in accordance with another preferred embodiment of the present invention.

Turning first to FIG. 2A, it is shown that the system preferably includes surface rotating functionality 200 operable for rotating a product 202 comprising a surface 204. Rotating functionality 200 may be, for example, a motorized turntable. On surface 204 there is provided a three-dimensional rotatably-readable encoding of data configured for optical rotational machine-reading such as the three-dimensional rotatably-readable encoding of data illustrated in FIG. 1A, which includes a multiplicity of three-dimensional concentric curves 206. As described hereinabove with regard to FIG. 1A, three-dimensional concentric curves 206 may be formed on surface 204 or may be formed on an article separate from surface 204, such as, for example, a sticker or a label, which is then fastened to surface 204.

It is appreciated that the system of FIG. 2A is also suitable for optical rotational machine-reading of data encoded in other examples of three-dimensional rotatably-readable encodings of data, such as, for example, the three-dimensional rotatably-readable encoding of data illustrated in FIG. 1B.

Surface 204 of product 202 may be, for example, a generally circular surface as shown in FIG. 2A, or a surface of any other suitable shape or dimension. Product 202 is preferably the subject of the data encoded in three-dimensional concentric curves 206. Product 202 may be, for example, a consumer product or a container having an interior volume, which volume contains a solid or liquid product such as, for example, fresh food, preserved food or raw food.

As shown in FIG. 2A, the data encoded in three-dimensional concentric curves 206 may include, for example, a price of product 202, a catalog number of product 202 or an expiration date of product 202.

The system of FIG. 2A also preferably includes light impinging and detection functionality 210 operable for impinging light onto three-dimensional concentric curves 206 formed on surface 204, and for detecting light reflected thereby. Light impinging and detection functionality 210 may include, for example, a light-emitting laser.

It is a particular feature of this embodiment of the present invention that three-dimensional concentric curves 206 are formed to reflect light impinging thereupon by light impinging and detection functionality 210 while product 202 is rotated in a plane parallel to surface 204, by rotating functionality 200. The characteristics of the reflected light represent the data encoded within three-dimensional concentric curves 206.

The characteristics of the light reflected from each of three-dimensional concentric curves 206 preferably comprise at least one of an angle of reflection of the reflected light and an intensity of the reflected light, however it is appreciated that the reflected light may have additional characteristics associated therewith. It is appreciated that the characteristics of the light reflected from each of three-dimensional concentric curves 206 correspond to physical characteristics of a corresponding one of three-dimensional concentric curves 206. The physical characteristics of each of three-dimensional concentric curves 206 may include, for example, a length of the curve, a distance between the curve and an adjacent concentric curve, and a height of the curve as dictated by a physical coating of the curve or by the material forming the curve. These characteristics of the curve are fundamental in characterizing the light reflected from the curve, and are therefore suitable for encoding data.

As further described hereinabove with regard to FIG. 1A, it is also appreciated that the speed of rotation of product 202 by surface rotating functionality 200 while light is impinged onto surface 204 also characterizes the light reflected from each of three-dimensional concentric curves 206. Therefore, three-dimensional concentric curves 206 may encode a multiplicity of data sets, wherein encoded data of each data set is represented by light reflected from surface 204 while product 202 is rotated at a corresponding speed.

The system of FIG. 2A also preferably includes data decoding functionality 220 operable, responsive to detecting light reflected from three-dimensional concentric curves 206 by light impinging and detection functionality 210, for decoding the data encoded in three-dimensional concentric curves 206. Data decoding functionality 220 is preferably also operable for controlling includes rotating functionality 200 and the speed of rotation thereof.

In the example of FIG. 2A, the data encoded in three-dimensional concentric curves 206 comprises a product code of product 202.

Turning now to FIG. 2B, it is shown that the system preferably includes surface rotating functionality 250 operable for rotating a product 252 comprising a surface 254. Rotating functionality 250 may be, for example, a motorized turntable. On surface 254 there is provided a three-dimensional rotatably-readable encoding of data configured for optical rotational machine-reading such as the three-dimensional rotatably-readable encoding of data illustrated in FIG. 1A, which includes a multiplicity of three-dimensional concentric curves 256. As described hereinabove with regard to FIG. 1A, three-dimensional concentric curves 206 may be formed on surface 204 or may be formed on an article separate from surface 204, such as, for example, a sticker or a label, which is then fastened to surface 204.

It is appreciated that the system of FIG. 2B is also suitable for optical rotational machine-reading of data encoded in other examples of three-dimensional rotatably-readable encodings of data, such as, for example, the three-dimensional rotatably-readable encoding of data illustrated in FIG. 1B.

Surface 254 of product 252 may be, for example, a generally circular surface as shown in FIG. 2B, or a surface of any other suitable shape or dimension. Product 252 is preferably the subject of the data encoded in three-dimensional concentric curves 256. Product 252 may be, for example, a consumer product or a container having an interior volume, which volume contains a solid or liquid product such as, for example, fresh food, preserved food or raw food.

As shown in FIG. 2B, the data encoded in three-dimensional concentric curves 256 may include, for example, instructions which, when read by a computer, cause the computer to process product 252 or the contents thereof in accordance with the instructions.

The system of FIG. 2B also preferably includes light impinging and detection functionality 260 operable for impinging light onto three-dimensional concentric curves 256 formed on surface 254, and for detecting light reflected thereby. Light impinging and detection functionality 260 may include, for example, a light-emitting laser.

It is a particular feature of this embodiment of the present invention that three-dimensional concentric curves 256 are formed to reflect light impinging thereupon by light impinging and detection functionality 260 while product 252 is rotated in a plane parallel to surface 254, by rotating functionality 250. The characteristics of the reflected light represent the data encoded within three-dimensional concentric curves 256.

The characteristics of the light reflected from each of three-dimensional concentric curves 256 preferably comprise at least one of an angle of reflection of the reflected light and an intensity of the reflected light, however it is appreciated that the reflected light may have additional characteristics associated therewith. It is appreciated that the characteristics of the light reflected from each of three-dimensional concentric curves 256 correspond to physical characteristics of a corresponding one of three-dimensional concentric curves 256. The physical characteristics of each of three-dimensional concentric curves 256 may include, for example, a length of the curve, a distance between the curve and an adjacent concentric curve, and a height of the curve as dictated by a physical coating of the curve or by the material forming the curve. These characteristics of the curve are fundamental in characterizing the light reflected from the curve, and are therefore suitable for encoding data.

As further described hereinabove with regard to FIG. 1A, it is also appreciated that the speed of rotation of product 252 by surface rotating functionality 250 while light is impinged onto surface 254 also characterizes the light reflected from each of three-dimensional concentric curves 256. Therefore, three-dimensional concentric curves 256 may encode a multiplicity of data sets, wherein encoded data of each data set is represented by light reflected from surface 254 while product 252 is rotated at a corresponding speed.

The system of FIG. 2B also preferably includes data decoding functionality 270 operable, responsive to detecting light reflected from three-dimensional concentric curves 256 by light impinging and detection functionality 260, for decoding the data encoded in three-dimensional concentric curves 256. Data decoding functionality 270 is preferably also operable for controlling includes rotating functionality 250 and the speed of rotation thereof.

In the example of FIG. 2B, the data encoded in three-dimensional concentric curves 256 comprises instructions for cooking the contents of product 252. Data decoding functionality 270, preferably connected to a cooking device such as an oven 280, may then instruct oven 280 to cook the contents of product 252 in accordance with the instructions.

It will be appreciated by persons skilled in the art that the present invention is not limited by what has been particularly shown and described hereinabove. Rather the scope of the present invention includes both combinations and sub-combinations of the various features described hereinabove as well as modifications thereof which would occur to persons skilled in the art upon reading the foregoing description and which are not in the prior art.

The invention claimed is:

1. An object bearing a three-dimensional rotatably-readable encoding of data configured for optical rotational machine-reading, said object being a subject of said data, said encoding of data comprising:
a multiplicity of three-dimensional shapes formed on a label adhered to a surface of said object, said surface being arranged for rotation in a plane coinciding with said surface, said multiplicity of three-dimensional shapes being formed to reflect light impinging thereupon while said surface is rotated, characteristics of said reflected light representing data encoded within said multiplicity of three-dimensional shapes,
said characteristics of said light reflected from each of said three-dimensional shapes corresponding at least to physical characteristics of a corresponding one of said three-dimensional shapes and a speed of said rotation.

2. An object bearing a three-dimensional rotatably-readable encoding of data according to claim 1 and wherein said physical characteristics of each of said three-dimensional shapes comprise a color of said shape.

3. An object bearing a three-dimensional rotatably-readable encoding of data according to claim 1 and wherein said physical characteristics of each of said three-dimensional shapes comprise at least one dimension of said shape.

4. An object bearing a three-dimensional rotatably-readable encoding of data according to claim 3 and wherein said at least one dimension of said shape comprises a width of said shape.

5. An object bearing a three-dimensional rotatably-readable encoding of data according to claim 3 and wherein said at least one dimension of said shape comprises a length of said shape.

6. An object bearing a three-dimensional rotatably-readable encoding of data according to claim 3 and wherein said at least one dimension of said shape comprises a distance between said shape and an adjacent shape.

7. An object bearing a three-dimensional rotatably-readable encoding of data according to claim 3 and wherein said at least one dimension of said shape comprises a height of said shape.

8. An object bearing a three-dimensional rotatably-readable encoding of data according to claim 7 and wherein said physical characteristics of each of said three-dimensional shapes comprise a material forming said shape.

9. An object bearing a three-dimensional rotatably-readable encoding of data according to claim 8 and wherein said height of said shape is characteristic of said material forming said shape.

10. An object bearing a three-dimensional rotatably-readable encoding of data according to claim 7 and wherein said physical characteristics of each of said three-dimensional shapes comprise a physical coating of said shape.

11. An object bearing a three-dimensional rotatably-readable encoding of data according to claim 10 and wherein said height of said shape is characteristic of said physical coating of said shape.

12. A system for optical rotational machine-reading of data encoded in a three-dimensional rotatably-readable encoding of data on a surface of an object, said object being a subject of said data, said system comprising:
surface rotating functionality operable for rotating said surface in a plane coinciding with said surface, said surface comprising a multiplicity of three-dimensional shapes formed on a label adhered to said surface;
light impinging functionality operable for impinging light onto said multiplicity of three-dimensional shapes, said multiplicity of three-dimensional shapes being formed to reflect light impinging thereupon while said surface is rotated by said surface rotating functionality;
light detecting functionality operable, responsive to said impinging light onto said multiplicity of three-dimensional shapes and to said rotating said surface by said surface rotating functionality, for detecting light reflected from said multiplicity of three-dimensional shapes, characteristics of said reflected light representing data encoded within said multiplicity of three-dimensional shapes; and
data decoding functionality operable, responsive to said detecting light reflected from said multiplicity of three-dimensional shapes, for decoding said data encoded in said multiplicity of three-dimensional shapes,
said characteristics of said light reflected from each of said three-dimensional shapes comprising at least one of an angle of reflection of said reflected light and an intensity of said reflected light.

13. A system for optical rotational machine-reading of data according to claim 12 and wherein said characteristics of said light reflected from each of said three-dimensional shapes correspond at least to physical characteristics of a corresponding one of said three-dimensional shapes and a speed of said rotation.

14. A system for optical rotational machine-reading of data according to claim 13 and wherein said physical characteristics of each of said three-dimensional shapes comprise a color of said shape.

15. A system for optical rotational machine-reading of data according to claim 13 and wherein said physical characteristics of each of said three-dimensional shapes comprise at least one dimension of said shape.

16. A system for optical rotational machine-reading of data according to claim 15 and wherein said at least one dimension of said shape comprises a width of said shape.

17. A system for optical rotational machine-reading of data according to claim 15 and wherein said at least one dimension of said shape comprises a length of said shape.

18. A system for optical rotational machine-reading of data according to claim 15 and wherein said at least one dimension of said shape comprises a distance between said shape and an adjacent shape.

19. A system for optical rotational machine-reading of data according to claim 15 and wherein said at least one dimension of said shape comprises a height of said shape.

20. A system for optical rotational machine-reading of data according to claim 19 and wherein said physical characteristics of each of said three-dimensional shapes comprises a material forming said shape.

\* \* \* \* \*